United States Patent Office 2,935,410
Patented May 3, 1960

2,935,410

COMPOSITION AND METHOD FOR IMPROVING FROZEN CONFECTIONS

Aaron Miller, San Diego, Calif., assignor to Kelco Company, San Diego, Calif., a corporation of Delaware No Drawing. Application April 28, 1955
Serial No. 504,671

14 Claims. (Cl. 99—136)

This invention relates to a new and useful composition for improving the manufacture of ice cream and other frozen milk products. More particularly, the invention relates to certain additives useful in ice cream mixes at low concentrations to produce a very dry and rigid ice cream having good creaminess and other desirable qualities.

An ice cream mix consists essentially of a mixture of dry milk solids, cream or butter, and sugar. These proportions vary with trade requirements and State regulations, but an average ice cream will have about 12% or more butter fat, 10% dry milk solids, and 16% sugar by weight.

In the usual production of ice cream, small portions of a stabilizer such as sodium alginate, sodium carboxymethyl cellulose, Irish moss, locust bean gum, or gelatin are added to the ice cream mix as a stabilizer to produce an ice cream having a smooth body and to prevent the growth of ice crystals in storage. Such additives are employed both alone and in various combinations. They will hereinafter be referred to as edible hydrophilic stabilizing colloids.

The alginates that are used as ice cream stabilizers are usually alginate compositions or certain alginates that are soluble in an ice cream mix. The compositions that are soluble in an ice cream mix are those containing about 50% by weight of sodium alginate with sugar added to improve the solubility in water, and with a small proportion of sodium phosphate added to render the composition compatible with the calcium ions of milk. Such a composition is described in United States Patents Nos. 2,097,228, 2,097,299, 2,097,231 and 2,485,934. Algins that are soluble in an ice cream mix are described in United States Patent No. 2,485,935, for example, propylene glycol alginates. The algins that are soluble in an ice cream mix and the algin compositions that are soluble in such a mix are hereinafter referred to as "ice cream mix soluble algins."

In accordance with this invention, I have found that the dryness and the whipping ability of ice cream prepared from ice cream mixes including the aforesaid ingredients as well as the dispersibility of said ingredients can be improved by the addition of a small quantity of glyceryl mono stearate (G.M.S.) in combination with a still smaller quantity of glyceryl mono oleate (G.M.O.).

The use of esters of a fatty acid and a polyhydric alcohol per se in an ice cream mix as emulsifying additives were known to me and to the art prior to this invention. My invention as aforesaid and as will be more particularly hereinafter described resides in my discovery of the surprising effectiveness of the combination of G.M.S. and G.M.O. as an ice cream mix additive in the proportions to be designated.

My invention is particularly suitable for use in combination with the aforementioned stabilizing colloids but it may be used without any such stabilizers and still give some improved characteristics to the emulsifying additives of the ice cream mix and an ice cream prepared therefrom.

My new combination of materials is not only readily dispersible by itself but it also increases the dispersibility of stabilizing colloids such as ice cream mix soluble alginates which tend to float and are not readily dispersible in an ice cream mix.

The material that I refer to as glyceryl mono stearate or G.M.S. is the commercial product which comprises both glyceryl mono stearate and glyceryl di stearate. G.M.S. is sold as having about 40%, 65% or 90% glyceryl mono stearate content by weight. I prefer a G.M.S. product having 40% to 65% by weight of glyceryl mono stearate content. In accordance with my invention, I use such a product in admixture with from 3% to 15% by weight thereof of G.M.O. The said combination is suitable for use as an ice cream or other frozen confection additive in small quantities, such as 0.05% to 0.30% by weight of the ice cream or other frozen confection mix.

To more particularly illustrate my invention, ice cream mixes were prepared consisting of about 12% fat, 10% non-fat milk solids, 12% cane sugar, 5% corn syrup solids, 0.25% of a milk soluble alginate composition, and 0.12% of various commercial glyceryl mono stearates in combination with G.M.O. The percentages referred to are by weight. The amount of G.M.O. employed was varied between 3% and 15% by weight of the G.M.S. used. The fat consisted of fresh manufacturing cream. Spray dried skimmed milk powder was used for the non-fat milk solids. The alginate composition was a commercial composition sold under the trade name Dariloid. This is a product made by applicant's employer in accordance with the disclosure of U.S. Patent No. 2,485,934 referred to in column 1, line 46, hereof.

The corn syrup solids was a commercial product sold under the trade name Frodex.

The ice cream mixes that were prepared as aforesaid were pasteurized at 160° F., for thirty (30) minutes, homogenized at 2500 lbs. on a single stage homogenizer, cooled over a surface cooler, and frozen on a batch freezer in duplicate batches.

When the milk soluble alginate composition containing the G.M.S. and G.M.O. was added to the mix as it was being agitated, it was observed that the composition readily dispersed and complete solubility was obtained in a matter of about 15 minutes' time.

Viscosity measurements were taken by collecting a 600 ml. sample of mix as it came over the cooler. The sample was poured back and forth between two beakers for a total of twelve times, at which time a viscosity reading was obtained with a Brookfield MV viscosimeter. The viscosimeter was allowed to rotate for a total of one minute before taking the reading. The same procedure was followed with the same 600 ml. sample of mix after it had been allowed to age for 24 hours. All ice cream samples were hardened 24 hours at —20° F. after which they were judged for body and texture by organoleptic methods. Meltdown tests were conducted by placing a small sample of hardened ice cream in a petri dish and allowing it to melt at room temperature. Heat shock tests were made by placing hardened ice cream samples in a cabinet in which the temperature alternated between +15° F. and —5° F. Each temperature was held for a period of two days, after which the controls were adjusted so that the alternate temperature would be obtained. After the samples were exposed to this treatment for a period of approximately two weeks, they were again judged for body and texture by organoleptic methods.

In comparison, a mix made with 0.25% of a milk soluble alginate composition and 0.12% of the same commercial G.M.S. product, but without the G.M.O., was observed. Under identical conditions of good agitation it was noted that this combination of alginate and G.M.S. floated on the surface of the mix and formed large lumps. A majority of these lumps remained floating on the surface of the mix and never dissolved in the normal time of processing. Therefore, when the mix was pumped to the homogenizer, some insoluble lumps remained on the bottom of the mixing vat and others collected in the sanitary pipe leading to the homogenizer as well as on the homogenizer filter screen. It was evident to me that this mix was not properly stabilized or emulsified because of these processing difficulties, and this was confirmed when the mix was frozen and also later tested as given in the procedure above.

In preparing and evaluating ice cream mixes with various additives as aforesaid, I found that my combination of G.M.S. and G.M.O. would produce an ice cream mix dispersible additive with milk soluble algins such as alginate compositions and propylene glycol alginates. My combination of G.M.S. and G.M.O. also produced an ice cream mix dispersible additive with other edible hydrophilic stabilizing colloids, including locust bean gum and sodium carboxymethyl cellulose with Irish moss. The additives were not only dispersible, but produced ice creams having desirable commercial properties in accordance with the various test methods that have hereinbefore been described.

In the foregoing, I have given various examples of my invention, but I do not intend to be limited thereby. It will be apparent to those skilled in the art that various combination of materials used in frozen milk products can be incorporated with my invention to produce desirable products.

I claim:

1. A new and useful composition particularly suitable for use as a frozen milk product mix additive comprising a commercial glyceryl mono stearate and from 3% to 15% by weight of said stearate of glyceryl mono oleate.

2. A new and useful composition particularly suitable for use as a frozen milk product mix additive comprising an edible hydrophilic stabilizing colloid, a commercial glyceryl mono stearate and glyceryl mono oleate in an amount equal to about 3% to 15% by weight of said stearate.

3. A new and useful composition particularly suitable for use as a frozen milk product mix additive comprising an ice cream mix soluble algin, a commercial glyceryl mono stearate and glyceryl mono oleate in an amount equal to about 3% to 15% by weight of said stearate.

4. A new and useful composition particularly suitable for use as a frozen milk product mix additive comprising a milk soluble alginate composition, a commercial glyceryl mono stearate and glyceryl mono oleate in an amount equal to about 3% to 15% by weight of said stearate.

5. A new and useful composition particularly suitable for use as a frozen milk product mix additive comprising a milk soluble propylene glycol alginate, a commercial glyceryl mono stearate and glyceryl mono oleate in an amount equal to about 3% to 15% by weight of said stearate.

6. An ice cream mix additive comprising a milk soluble propylene glycol alginate, locust bean gum, Irish moss, a commercial glyceryl mono stearate containing at least 40% by weight of glyceryl mono stearate and from 3% to 15% by weight of said commercial stearate of glyceryl mono oleate.

7. An ice cream mix additive comprising an edible hydrophilic stabilizing colloid, a commercial glyceryl mono stearate having a glyceryl mono stearate content of 40% to 65% by weight and 3% to 15% by weight of said commercial stearate of glyceryl mono oleate.

8. The process of manufacturing an improved ice cream product which comprises adding and dispersing in the mix therefor a small percentage of an edible hydrophilic stabilizing colloid and a small percentage of a commercial glyceryl mono stearate having a glyceryl mono stearate content of 40% to 65% by weight and 3% to 15% by weight of said small percentage of commercial stearate of glyceryl mono oleate.

9. The process of manufacturing an improved ice cream product which comprises adding and dispersing in the mix therefor from 0.05% to 0.3% of a commercial glyceryl mono stearate and from 3% to 15% by weight of said stearate of glyceryl mono oleate.

10. A new and useful frozen milk product containing a small proportion of an additive comprising a commercial glyceryl mono stearate having a glyceryl mono stearate content of at least 40%, and 3% to 15% by weight of said commercial stearate of glyceryl mono oleate.

11. A new and useful frozen milk product containing a small proportion of an additive comprising an edible hydrophilic stabilizing colloid, a commercial glyceryl mono stearate having a glyceryl mono stearate content of at least 40%, and 3% to 15% by weight of said commercial stearate of glyceryl mono oleate.

12. A new and useful frozen milk product containing a small proportion of an additive comprising a milk soluble algin, a commercial glyceryl mono stearate having a glyceryl mono stearate content of at least 40%, and 3% to 15% by weight of said commercial stearate of glyceryl mono oleate.

13. A new and useful frozen milk product containing a small proportion of an additive comprising a milk soluble alginate composition, a commercial glyceryl mono stearate having a glyceryl mono stearate content of at least 40%, and 3% to 15% by weight of said commercial stearate of glyceryl mono oleate.

14. A new and useful frozen milk product containing a small proportion of an additive comprising a milk soluble propylene glycol alginate, a commercial glycerol mono stearate having a glyceryl mono stearate content of at least 40%, and 3% to 15% by weight of said commercial stearate of glyceryl mono oleate.

References Cited in the file of this patent

UNITED STATES PATENTS

| | | |
|---|---|---|
| 2,065,398 | Roth | Dec. 22, 1936 |
| 2,395,061 | Musher | Feb. 19, 1946 |
| 2,423,613 | Nelson | July 8, 1947 |
| 2,485,935 | Steiner | Oct. 25, 1949 |
| 2,587,369 | Nash | Feb. 26, 1952 |

OTHER REFERENCES

Bryan: The New Stabilizers, Ice Cream Review, November 1941, p. 39.